Sept. 18, 1951 C. M. GUNN 2,568,000

SOUND RECORDING AND REPRODUCING APPARATUS

Filed July 3, 1948

INVENTOR.
Claude M. Gunn
BY Thos. E. Scofield
ATTORNEY.

Patented Sept. 18, 1951 2,568,000

UNITED STATES PATENT OFFICE 2,568,000

SOUND RECORDING AND REPRODUCING APPARATUS

Claude M. Gunn, Kansas City, Mo.

Application July 3, 1948, Serial No. 36,852

6 Claims. (Cl. 274—11)

Figure 1:
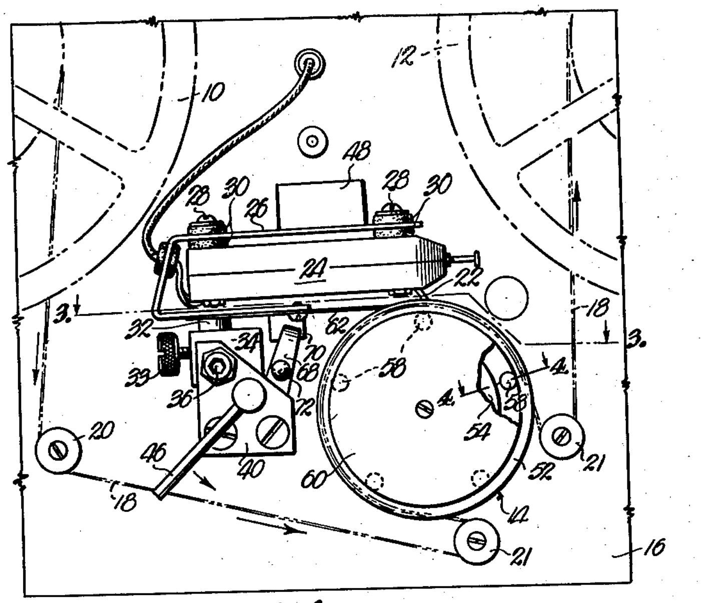

The present invention relates in general to the art of recording sound on motion picture film and subsequently reproducing the sound from the recording; and it deals more particularly with improvements in the recording and reproducing apparatus disclosed in my co-pending application Serial No. 748,976, filed May 19, 1947, of which the present application is a continuation-in-part.

In the aforementioned application I disclosed a machine having a pair of interchangeable electro-mechanical transducers (one a recording head and the other a reproducing or pick-up head), each transducer having a stylus that in use is adapted to ride on the motion picture film strip as the latter travels longitudinally over a rotating drum. In that application, arrangements were shown for mounting critical parts of the apparatus in rubber or similar vibration absorbing material in such a fashion as to minimize the extent to which extraneous vibration manifests itself in the trace left by the recording stylus and in the sounds ultimately reproduced from the trace by the pick-up stylus.

An object of the present invention is to still further reduce such vibration.

Another object is to provide an improved arrangement for imparting the movement of the rotating drum to the film in order to produce a longitudinal movement of the latter which is uniform in speed yet free from vibrations of the character induced in the film by conventional sprocket drives.

A further object is to prevent lateral shifting of the film as it passes under a laterally oscillating stylus thereby to prevent any loss of fidelity either in recording or in reproduction.

Still another object is to provide a film drum having a hard surface backing up the portion of the film travelling under the stylus but having a surface section of vibration absorbing material which engages other parts of the film to filter and dampen out induced or parasitic vibration tending to appear in the film.

Another object is to provide an improved device for holding the film flat against the drum as it passes under the stylus. A further object is to cushion the stylus against the shock tending to occur when a film splice passes same.

An additional very important object is to make it possible to align the reproducing or pick-up stylus with the sound track on the film with a very high degree of precision; more specifically it is an object to provide a novel means for indexing the styli of both transducers accurately relative to the edge of the film strip with a view, first, to maintaining the sound track produced by the recording stylus at a uniform distance from the edge and, second, to maintaining the pick-up stylus in the track. Another object is to provide, in conjunction with the indexing arrangement, means for shifting the stylus of one transducer laterally of the film strip.

Other and further objects, together with the novel features of construction whereby the objects are achieved, will appear in the course of the following description of the invention.

Figure 2:
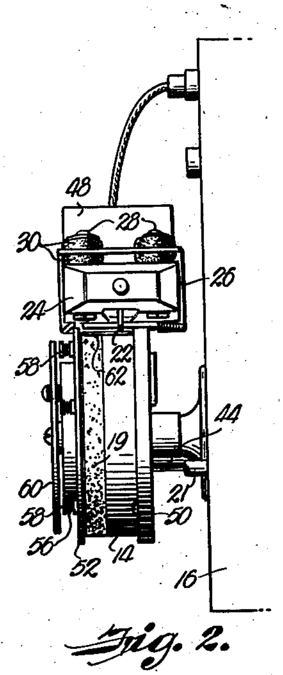
Figure 3:
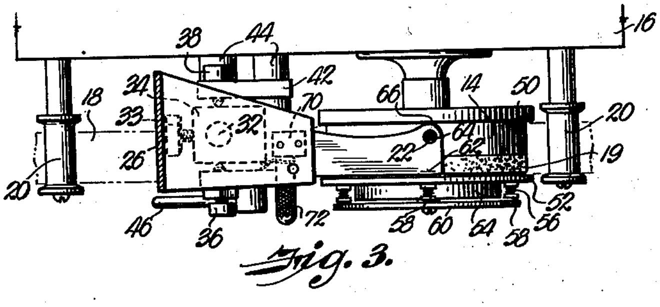
Figure 4:
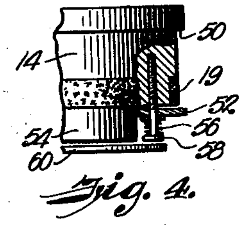
Figure 5:
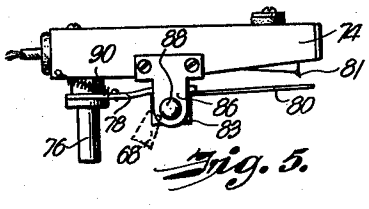
Figure 6:
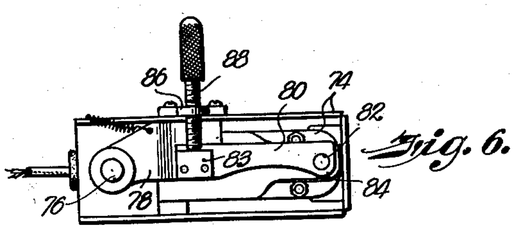

In the accompanying drawings which form a part of the specification and are to be read in conjunction therewith, and in which like reference numerals are employed to indicate like parts of the various views:

Fig. 1 is a side elevational view showing the recording head in operating position, Fig. 2 is an end elevational view of the same apparatus, Fig. 3 is a sectional elevation taken along the line 3—3 of Fig. 1 in the direction of the arrows, Fig. 4 is a fragmentary cross section taken along the line 4—4 of Fig. 1, Fig. 5 is a side elevation of the reproducing or play-back head, and Fig. 6 is a view of the underside of the play-back head.

Referring first to Fig. 1, the film reels 10 and 12 and the drum 14 are rotatably mounted on the outside of the cabinet or housing 16, and all three are turned in a clockwise direction by mechanism inside the housing, whereby film 18 is fed in the direction indicated by the arrows. The drive mechanism for the reels and drum is not illustrated, being no part of the present invention, but may be assumed to be the same as disclosed in my co-pending application Serial No. 748,976. In traveling from the supply reel 10 to the take-up reel 12, the film passes not only over drum 14 but also around the freely rotatable idler pulleys 20 and 21 mounted on the housing, these serving to guide the film to and from the drum.

The film drum 14 is recessed to receive a band 19 of vibration dampening material which, as to the film, has a high coefficient of friction thereby to minimize slippage of the film on the drum. Preferably I employ granulated cork imbedded in a rubber matrix, but satisfactory results can be obtained with other materials, for instance, rubber alone, leather, or various plastics.

As the drum turns and the film advances around same, it passes under the stylus 22 of the recording head 24. The head is of conventional form and is resiliently mounted in a frame 26 by means of screws 28 extending through rubber grommets 30. On the underside of the frame and rigidly affixed thereto is a downwardly projecting post or stem 32 adapted to swivel freely in a socket in the block 34. This permits lateral movement of the head relative the film. A thumb screw 33 is provided which may be tightened against the stem in order to lock it securely to block 34, for example during transportation of the machine from place to place, but it will be understood that the screw is loosened when the apparatus is in use for recording or reproducing sound.

To permit raising and lowering of the head, block 34 can turn about a horizontal axis, being pivotaly mounted between adjustable bearing pins or arbors 36 and 38 which are carried in the spaced plates 40 and 42. These plates in turn are supported on the housing 16 by means of posts 44. Under the forward end of block 34 is a cam, not shown, which may be turned by moving handle 46 in the direction indicated by the arrow thereby to elevate the recording head and raise stylus 22 clear of the film. A weight 48 on the frame 26 urges the head downwardly causing the stylus to bear on the film with a predetermined pressure when the head is in lowered position.

Up to this point, the construction and mounting arrangement of the head is substantially identical to that disclosed in my co-pending application, reference to which may be made for a more comprehensive disclosure of the structural details.

An important feature of the invention resides in the arrangement for indexing the stylus relative the edge of the film strip whereby the sound track is accurately maintained at a predetermined distance from the film's edge. To achieve this end, there is provided on the drum 14 a flange or shoulder 50 against which the edge of the film strip 18 is urged by means of an annular plate 52 pressing on the opposite edge. The latter plate loosely encircles a reduced portion 54 of the drum and is held firmly against the edge of the film by a number of small coiled compression springs 56 each encircling the stem of a screw 58. A guard disk 60 fastened to the drum covers the screws and springs to prevent accidental contact therewith.

Commercial film varies considerably in width, but it will be evident that the above arrangement of small coiled springs biassing the plate 52 independently at a number of points about its circumference will adjust the plate automatically and continuously to the film width while maintaining one edge of the film always against shoulder 50. The frictional engagement with the film provided by this effective gripping action insures that the film moves with the drum and makes unnecessary the conventional drive sprocket which in the past has been a troublesome source of vibration. It is essential that the film engage the drum around more than half of its circumference, and guide rollers 21 preferably are so located as to make the film follow the drum through approximately 240° of its rotation (see Fig. 1). If it follows the drum through less than 180° there is a tendency for the plate 52 to wedge under the film at the point where the film reaches the drum, so that the film rides up between shoulder 50 and plate 52 (i. e., moves away from the drum's axis) producing faulty operation.

On the bottom of the recording head frame 26 there is a flat hold down spring 62 which projects over drum 14 and, when the head is lowered as shown, this spring rides on the surface of the film, maintaining it flat against the drum. In the spring there is provided an aperture 64 through which the stylus 22 projects to engage the film; in addition to holding the film flat, the spring cushions the stylus against the shock which otherwise would occur when a film splice travels past.

The side of the film hold down spring nearest shoulder 50 is made concave to provide, adjacent the stylus, a projection 66 adapted to bear against the shouder 50. This projection is rounded, and is so positioned as to be tangent to the shoulder at its point of contact, thereby to minimize friction.

Another spring (68) applies a lateral force to the frame 26 tending to turn the head about its supporting post or stem 32 in such a direction as to maintain projection 66 against the shoulder, and since the film strip also is pressed against this shoulder, it is assured that the sound track is uniformly spaced a predetermined distance from the edge of the film. Spring 68 is mounted on plate 40 with its free end bearing against a downwardly extending projection 70 on the frame 26.

Attention is directed to the fact that the portion of the film strip traveling under stylus 22 is backed up by the hard surface of drum 14, this having been found to be the most satisfactory way of embossing a high fidelity sound track or groove on the film. The stylus pressure required to obtain a satisfactory trace makes it inevitable that the stylus impose some drag on the film, but the hold down spring 62 prevents the film from bunching up ahead of the stylus. Vibrating laterally of the film, the stylus naturally tends to shift the film laterally on the drum, and such induced lateral movement of the film obviously must be prevented because if it is not, the trace left on the film will not faithfully represent the vibrations on the stylus.

In my apparatus, lateral shifting of the film is virtually eliminated by the spring biased annular plate 52 which always maintains one edge of the film strip tightly against shoulder 50 as explained hereinbefore. Important assistance is rendered by the resilient band 19 whose frictional engagement with the film for considerable distance along the film's length not only resists lateral shifting of the film in the region of the stylus but also dampens and filters out any induced or parasitic vibration tending to appear in the film strip.

Spring 68 has a handle 72 by which it may easily be deflected away from the projection 70 during insertion or removal of the recording head. To remove the recording head, it is only necessary to lift the same upwardly in such a fashion as to withdraw the stem 32 from its socket in the block 34. The reproducing or play-back head 74 (Figs. 5 and 6) then may be in stalled, simply by inserting its stem into the same socket. This stem is secured to the underside of the play-back head and carries a swinging arm 78 which has a limited pivotal movement about the axis of the stem. Extending forwardly from the arm is a flat spring 80 similar to the film hold down spring 62 on the recording head; when the play-back head is in place and is lowered by means of handle 46, spring 80, bearing against the surface of the film, is deflected upwardly so that stylus 81 projects through aperture 82 to engage the film. At the same time, spring 68, pressing against the lug 83 on arm 78 as indicated in dotted lines, maintains the rounded projection 84 against shoulder 50 of the drum. Since the edge of the film is also pressed against this shoulder as hereinbefore explained, it will be evident that spring 80 and arm 78 always occupy a predetermined position relative the edge of the film.

On the play-back head there is a down wardly extending member 86 threaded to receive a lateral adjustment screw 88, the end of which is urged against lug 83 by means of a coiled tension spring 90. One end of the coiled spring is attached to the rear end of the play-back head and the other is attached to arm 78. By turning screw 88 in or out, the play-back head may be caused to turn slightly about the axis of stem 76 thereby to adjust the stylus 81 laterally relative the film strip traveling around the drum 14. This makes it possible to adjust the stylus so that it tracks perfectly in the sound groove of the film regardless of the spacing between the groove and the edge of the film.

Such adjustment is important for several reasons. In the first place, it makes the apparatus readily adaptable for use with film on which the sound groove has been made by other equipment than that shown in Figs. 1 to 4. Again, it makes it unnecessary for the manufacturer to exactly match the spacing of the play-back stylus to the spacing of the recording stylus, as would be required if the play-back stylus were permanently fixed in position. Such matching, if attempted, obviously would have to be carried out with very great precision, and because of the narrow tolerances that would have to be maintained, would greatly increase the manufacturing costs; this expense is obviated by my arrangement.

The importance of indexing the styli of both transducers relative the fixed flange on drum 18 will readily be appreciated if it is understood that even with careful manufacture there inevitably is enough axial play in the shaft carrying the drum to permit the drum to move a short distance in and out relative the front of housing 16. In so doing, it naturally carries the film in and out with it. The resultant lateral travel of the film may be of the order of only a few thousandths of an inch but it will be obvious that if the pick-up head were mounted in fixed relation to the housing 16, its stylus would be unable to follow the weaving sound track. The difficulty can not be overcome by allowing the pick-up head to swivel freely because the embossed sound track necessarily is too shallow to guide the pick-up stylus as is done where deeper sound grooves are feasible.

My arrangement insures that regardless of any axial travel of the drum, the pick-up stylus, when once adjusted, is maintained at an uniform distance from the guiding edge of the film. Since the same precaution is taken in connection with the recording unit, alignment between the pick-up stylus and the sound track is maintained with a high degree of precision.

Thus it will be seen that all the ends and objects hereinbefore set forth have been achieved, the invention having other advantages which are obvious and which are inherent to the apparatus.

It will be understood that certain features and subcombinations are of utility and may be employed without reference to other features and subcombinations. This is contemplated by and is within the scope of the appended claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. Apparatus of the character described comprising a rotating drum over which a strip of film is adapted to travel, a flange on the drum adjacent one edge of the film, means for applying pressure to the opposite edge of the film to maintain said one edge against said flange, a transducer having a flat spring riding on said film between said flange and said pressure means to hold the film against the drum, said transducer and spring movable as a unit laterally of the film, means urging the edge of the spring against said flange, and a stylus on the transducer extending through an opening in the spring to engage the film.

2. Apparatus of the character described comprising a rotating drum over which a strip of film is adapted to travel, a flange on the drum adjacent one edge of the film, means for applying pressure to the opposite edge of the film to maintain said one edge against said flange, a stationary member riding on the film between said flange and said pressure means, an indexing device urging said member against said flange, a stylus extending through an opening in said member to engage the film, and means for moving the stylus relative said member to adjust the position of the stylus laterally of the film.

3. Apparatus of the character described comprising a rotating drum over which a strip of film is adapted to travel, a flange on the drum adjacent one edge of the film, means for applying pressure to the opposite edge of the film to maintain said one edge against said flange, a transducer having a stylus engaging said film between the flange and said pressure means, said transducer movable laterally of the film and having a guide finger adjacent said flange, and means for applying a lateral force on said transducer to maintain said finger against the flange.

4. Apparatus of the character described comprising a rotating drum over which a strip of film is adapted to travel, a flange on the drum adjacent one edge of the film, means for applying pressure to the opposite edge of the film to maintain said one edge against said flange, a transducer having a stylus engaging said film between the flange and said pressure means, a guide finger for the transducer, means for applying a lateral force to said finger to maintain same against the flange, and a device operable to adjust said transducer laterally of the film relative said guide finger.

5. Apparatus of the character described comprising a rotating drum over which a strip of film is adapted to travel, a transducer adjacent the drum having a stylus engaging the film as it passes over the drum, means for indexing the transducer relative the edge of the film to maintain the stylus in predetermined spaced relationship to said edge, said drum having an inset annulus of vibration absorbing material engaging the underside of the film, said annulus being spaced laterally from the stylus.

6. Apparatus as in claim 5 wherein said annulus comprises granular cork in a rubber matrix.

CLAUDE M. GUNN.

(References on following page)

REFERENCES CITED

The following references are of record in the file of this patent:

UNITED STATES PATENTS

| Number | Name | Date |
|---|---|---|
| 1,801,472 | Whitson | Apr. 21, 1931 |
| 1,886,540 | Grant | Nov. 8, 1932 |
| 2,096,113 | Kiel | Oct. 19, 1937 |
| 2,105,741 | Kuhlik | Jan. 18, 1938 |
| 2,188,687 | Lohn | Jan. 30, 1940 |
| 2,257,028 | Westerkamp | Sept. 23, 1941 |
| 2,289,555 | Simons | July 14, 1942 |
| 2,460,411 | Calvert | Feb. 1, 1949 |

FOREIGN PATENTS

| Number | Country | Date |
|---|---|---|
| 181,859 | Switzerland | Apr. 1, 1936 |
| 601,126 | Germany | Aug. 8, 1934 |